United States Patent
Faxér et al.

(10) Patent No.: US 11,659,426 B2
(45) Date of Patent: May 23, 2023

(54) SYSTEMS AND METHODS FOR PRIORITIZING CHANNEL STATE INFORMATION REPORTS

(71) Applicant: Telefonaktiebolaget LM Ericsson (publ), Stockholm (SE)

(72) Inventors: Sebastian Faxér, Järfälla (SE); Robert Baldemair, Solna (SE); Sorour Falahati, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/340,293

(22) PCT Filed: Jan. 11, 2019

(86) PCT No.: PCT/EP2019/050717
§ 371 (c)(1),
(2) Date: Apr. 8, 2019

(87) PCT Pub. No.: WO2019/138088
PCT Pub. Date: Jul. 18, 2019

(65) Prior Publication Data
US 2020/0153541 A1 May 14, 2020

Related U.S. Application Data

(60) Provisional application No. 62/617,100, filed on Jan. 12, 2018.

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0026* (2013.01); *H04L 1/0027* (2013.01);
(Continued)

(58) Field of Classification Search
CPC .................................................... H04W 24/10
See application file for complete search history.

(56) References Cited

U.S. PATENT DOCUMENTS 9,554,297 B2 1/2017 Han et al.
9,848,412 B2 12/2017 Yang et al.
(Continued)

FOREIGN PATENT DOCUMENTS

| CN | 103582003 A | 2/2014 |
|---|---|---|
| CN | 105162508 A | 12/2015 |
| WO | 2016163855 A1 | 10/2016 |

OTHER PUBLICATIONS

3rd Generation Partnership Project, "3rd Generation Partnership Project; Technical Specification Group Radio Access Network; NR; Physical layer procedures for data (Release 15)", Technical Specification, 3GPP TS 38.214 V1.3.0, Dec. 1, 2017, pp. 1-71, 3GPP, France.

(Continued)

*Primary Examiner* — Jason E Mattis
(74) *Attorney, Agent, or Firm* — Coats & Bennett, PLLC

(57) ABSTRACT

There is provided a method performed by a wireless device for prioritizing channel state information reports. The method comprises determining to transmit a portion of a plurality of channel state information reports that are each separately scheduled for transmission responsive to determining that the reports would be transmitted in a same slot with acknowledgement information indicating whether data was successfully or unsuccessfully received by the wireless device. The method further comprises transmitting, by the wireless device in that slot, that portion of the channel state information and the acknowledgement information. There is also provided a method performed by a base station, a wireless device and a base station.

17 Claims, 18 Drawing Sheets

(51) Int. Cl.
*H04L 1/1607* (2023.01)
*H04L 1/1812* (2023.01)
*H04L 1/1829* (2023.01)
*H04L 5/00* (2006.01)
*H04W 72/566* (2023.01)

(52) U.S. Cl.
CPC .......... *H04L 1/1671* (2013.01); *H04L 1/1819* (2013.01); *H04L 1/1854* (2013.01); *H04L 5/0055* (2013.01); *H04L 5/0057* (2013.01); *H04W 72/569* (2023.01)

(56) References Cited

U.S. PATENT DOCUMENTS

| | | | |
|---|---|---|---|
| 2012/0140649 | A1 | 6/2012 | Choudhury et al. |
| 2012/0140708 | A1 | 6/2012 | Choudhury et al. |
| 2014/0036704 | A1 | 2/2014 | Han et al. |
| 2014/0233419 | A1 | 8/2014 | Cheng et al. |
| 2017/0041922 | A1 | 2/2017 | Chen et al. |
| 2017/0366998 | A1 | 12/2017 | Lee et al. |
| 2019/0349052 | A1* | 11/2019 | Yum ..................... H04W 24/10 |
| 2020/0067584 | A1* | 2/2020 | Kang ..................... H04B 7/088 |
| 2020/0295905 | A1* | 9/2020 | Takeda .................. H04W 72/04 |
| 2020/0344770 | A1* | 10/2020 | Yuan ..................... H04L 5/0053 |

OTHER PUBLICATIONS

3rd Generation Partnership Project, "3rd Generation Partnership Project; Technical Specification Group Radio Access Network; NR; Physical layer procedures for data (Release 15)", Technical Specification, GPP TS 38.214 V1.3.0 Track Changes, Dec. 1, 2017, pp. 1-71, 3GPP, France.

Panasonic, "Periodic CQI/PMI/RI Reporting for Carrier Aggregation", 3GPP TSG-RAN WG1 Meeting 62, Madrid, Spain, Aug. 23, 2010, pp. 1-3,R1-104887, 3GPP.

Ericsson, "Offline session notes CSI reporting (AI 7.2.2.2)", 3GPP TSG-RAN WG1 Meeting 90bis, Prague, CZ, Oct. 9, 2017, pp. 1-6, R1-1719142, 3GPP.

Samsung, "Remaining Issues for Short PUCCH with UCI of more than 2 Bits", 3GPP TSG RAN WG1 Meeting 91, Reno, USA, Nov. 27, 2017, pp. 1-5, R1-1720327, 3GPP.

Ericsson, "Summary of views on CSI reporting", 3GPP TSG-RAN WG1 #91, Nov. 27-Dec. 1, 2017, pp. 1-21, Reno, US, R1-172451.

* cited by examiner

900 receive, by a network node in a same slot, from a wireless device, at least one prioritised channel state information report selected from a plurality of channel state information reports and acknowledgement information indicating whether data was successfully or unsuccessfully received by the wireless device, wherein each of the plurality of channel state information reports and the acknowledgement information is separately scheduled for transmission by the wireless device in the same slot, 901 separately schedule the plurality of channel state information reports for transmission by the wireless device 902

FIG. 9

SYSTEMS AND METHODS FOR PRIORITIZING CHANNEL STATE INFORMATION REPORTS

TECHNICAL FIELD

The present disclosure relates to a method performed by a wireless device for prioritizing channel state information reports. The present disclosure further relates to a method performed by a base station, a wireless device and a base station.

BACKGROUND

The next generation mobile wireless communication system (5G) or new radio (NR), will support a diverse set of use cases and a diverse set of deployment scenarios. The later includes deployment at both low frequencies (100s of MHz), similar to LTE today, and very high frequencies (mm waves in the tens of GHz).

Similar to LTE, NR will use OFDM in the downlink (i.e. from a network node, gNB, eNB, or base station, to a user equipment or UE). In the uplink (i.e. from UE to gNB), both DFT-spread OFDM and OFDM will be supported.

The basic NR physical resource can thus be seen as a time-frequency grid as illustrated in FIG. 1, where each resource element corresponds to one OFDM subcarrier during one OFDM symbol interval. Resource allocation in a slot is described in terms of resource blocks (RBs) in the frequency domain and number of OFDM symbols in the time domain. A RB corresponds to 12 contiguous subcamers and a slot consists of 14 OFDM symbols.

Different subcarrier spacing values are supported in NR. The supported subcarrier spacing values (also referred to as numerologies) in NR are given by $\Delta f=(15 \times 2^a)$ kHz where a is a non-negative integer.

In the time domain, downlink and uplink transmissions in NR is organized into equally-sized subframes similar to LTE as shown in FIG. 2. A subframe is further divided into slots and the number of slot per subframe is $2^{a+1}$ for a numerology of $(15 \times 2^a)$ kHz.

NR supports "slot based" transmission. In each slot, the gNB transmits downlink control information (DCI) about which UE data is to be transmitted to and what resources in the current downlink slot the data is transmitted on. The DCI is carried on the Physical Control Channel (PDCCH) and data is carried on Physical Downlink Shared Channel (PDSCH).

This PDCCH is typically transmitted in control resource sets (CORSETs) in the first few OFDM symbols in each slot. A UE first decodes PDCCH and if a PDCCH is decoded successfully, it then decodes the corresponding PDSCH based on the decoded DCI in the PDCCH.

Uplink data transmissions are also dynamically scheduled using PDCCH. Similar to downlink, a UE first decodes a uplink grant in a DCI carried by PDCCH and then transmits data over the Physical Uplink Shared Channel (PUSCH) based the decoded control information in the uplink grant such as modulation order, coding rate, uplink resource allocation, and etc.

Each UE is assigned with a unique C-RNTI (Cell Radio Network Temporary Identifier) during network connection. The CRC (cyclic redundancy check) bits attached to a DCI for a UE is scrambled by the UE's C-RNTI, so a UE recognizes its own DCI by checking the CRC bits of the DCI against the assigned C-RNTI.

PUCCH

Operation of NR requires the transmission of various control information from the UE to the network. Examples of such uplink control information (UCI) are hybrid-ARQ (HARQ) acknowledgements, channel-state information (CSI), and scheduling request (SR). The UCI can be transmitted on
- a separate control channel, PUCCH, occurring either at the end of the slot interval or during the slot interval multiplexed with data and transmitted on PUSCH ("UCI on PUSCH")

There are multiple formats defined for PUCCH that can be used to transmit control information as shown in the table below.

TABLE 1

Possible PUCCH format definitions

| PUCCH format | Number of symbols in a slot | Number of UCI bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH formats 0 and 2 are referred to as short PUCCH formats since they are transmitted only over 1 or two OFDM symbols in a slot. PUCCH formats 1, 3 and 4 are referred to as long PUCCH formats since they can be transmitted in up to 14 OFDM symbols (without slot aggregation) and even across multiple slots if PUCCH slot aggregation is configured. As shown in the table, both long and short PUCCH formats are subdivided depending on the number of UCI bits they may contain.

A single slot may contain multiple transmissions of a single PUCCH format as well as multiple PUCCH formats which may or may not be transmitted by the same UE. For instance, a slot spanning 14 OFDM symbols may contain a long PUCCH spanning 12 OFDM symbols followed by a short PUCCH spanning two OFDM symbols.

The different PUCCH formats are used for different purposes. The PUCCH formats that contain 2 bits or less can generally multiplex multiple UEs in the same time and frequency resources with the long PUCCH being able to multiplex more users than the short PUCCH. PUCCH format 4 can multiplex multiple UEs with each UE having more than 2 bits.

PUCCH Resources

A PUCCH resource that is used by a UE to transmit UCI may be defined by the physical resource blocks (PRBs), the OFDM symbols, the sequences along with their cyclic shifts and orthogonal cover codes (OCCs) used. It should be noted that OCCs, sequences and cyclic shifts are applicable only for some PUCCH formats.

In any given slot, the UE may have to transmit one or more of the following.
- HARQ acknowledgements (HARQ-ACK)
- Channel state information (CSI)
- Scheduling Requests (SR)

CSI information may be scheduled to be transmitted periodically, e.g., once every N slots. SR is transmitted by the UE when the UE has some data to be sent. HARQ-ACK information is transmitted to acknowledge whether PDSCH transmissions in the downlink were successfully received or not. HARQ-ACK may consist of a single bit to acknowledge an entire transport block or multiple bits, each representing a code block group (CBG), i.e., a set of code blocks among the code blocks that comprise a transport block.

Determination of PUCCH Resources

The PUCCH resource to be used for each of the different types of UCI can generally be controlled by the gNB. This can be done via explicit resource assignments either through semi-static configuration (RRC signaling) or through dynamic signaling of downlink control information (DCI) messages.

In addition, the UE can also determine PUCCH resources implicitly. For example, the PUCCH resource can be determined based on the number of UCI bits to be transmitted in a slot. PUCCH resources for HARQ-ACK transmission for a scheduled PDSCH may also be determined implicitly by the control channel element (CCE) at which the received control channel message (PDCCH) scheduling the PDSCH begins. This approach is used in LTE. Such implicit resource determination can reduce the overhead incurred for dynamic signaling and help to avoid collisions between the PUCCH resources determined by different UEs for transmission of UCI.

Since the gNB is generally aware of the number of bits to be transmitted by the UE, or which resources to expect autonomous transmissions by the UE such as SR, the gNB is aware of the resources on which all the UCI information must be received. There are certain error cases where a mismatch can occur between the UE and the gNB on the resources to be used for PUCCH transmission, e.g., when certain downlink assignments for PDSCH are missed. However, such mismatches occur with a very small probability and can sometimes be handled either by the gNB performing decoding on multiple hypothesized PUCCH resources.

CSI Reporting

Channel state information (CSI) feedback is used by gNB to obtain DL CSI from a UE in order to determine how to transmit DL data to a UE over plurality of antenna ports. CSI typically includes a channel rank indicator (RI), a precoding matrix indicator (PMI) and a channel quality indicator (CQI). RI is used to indicate the number of data layers that can be transmitted simultaneously to a UE, PMI is used to indicate the precoding matrix over the indicated data layers, and CQI is used to indicate the modulation and coding rate can be achieved by with the indicated rank and the precoding matrix.

In NR, in addition to periodic and aperiodic CSI reporting as in LTE, semi-persistent CSI reporting is also supported. Thus, three types of CSI reporting will be supported in NR as follows:

Periodic CSI (P-CSI) Reporting on PUCCH: CSI is reported periodically by a UE. Parameters such as periodicity and slot offset are configured semi-statically by higher layer RRC signaling from the gNB to the UE Aperiodic CSI (A-CSI) Reporting on PUSCH: This type of CSI reporting involves a single-shot (i.e., one time) CSI report by a UE which is dynamically triggered by the gNB using DCI. Some of the parameters related to the configuration of the aperiodic CSI report is semi-statically configured by RRC but the triggering is dynamic Semi-Persistent CSI (SP-CSI) Reporting on PUCCH: similar to periodic CSI reporting, semi-persistent CSI reporting has a periodicity and slot offset which may be semi-statically configured. However, a dynamic L2 control message conveyed over MAC CE is needed to activate or deactivate the SP-CSI reporting CSI Frame Work in NR:

In NR, a UE can be configured with $N \geq 1$ CSI reporting settings (i.e. ReportConfigs), $M \geq 1$ resource settings (i.e. ResourceConfigs), and 1 CSI measurement setting, where the CSI measurement setting includes $L \geq 1$ Measurement Links (i.e. MeasLinkConfigs). At least the following configuration parameters are signaled via RRC for CSI acquisition.

1. N, M, and L are indicated either implicitly or explicitly
2. In each CSI reporting setting, at least the followings are included:
   reported CSI parameter(s) such as RI, PMI, CQI
   CSI Type if reported such Type I or Type II
   Codebook configuration including codebook subset restriction
   Time-domain behavior such as P-CSI, SP-CSI, or A-CSI
   Frequency granularity for CQI and PMI such as wideband, partial band, or subband
   Measurement restriction configurations such as RBs in frequency domain and slots in time domain
3. In each CSI-RS resource setting:

A configuration of $S \geq 1$ CSI-RS resource set(s)

A configuration of $K_s \geq 1$ CSI-RS resources for each resource set s, including at least: mapping to REs, the number of antenna ports, time-domain behavior, etc.

Time domain behavior: aperiodic, periodic or semi-persistent

4. In each of the L links in CSI measurement setting:

CSI reporting setting indication. Resource setting indication, quantity to be measured (either channel or interference)

One CSI reporting setting can be linked with one or multiple Resource settings

Multiple CSI reporting settings can be linked to one resource setting

---

CAI report ARC configuration
In Ts 38.331 v1,0,1, a CSI Report Setting is configured as below:

CSI-ReportConfig : :--				SEQUENCE {
   reportConfigId				CSI-PeportConfigId,
   -- Time domain behavior of reporting configuration.
   reportConfigType				CHOICE {
     periodic					SEQUENCE {
       -- Periodicity and slot offset . Corresponds to L1 parameter 'ReportPeriodicity' and 'ReportSlotOffset'
       -- (see 38.214, section. section 5.2.1.4).
       reportSlotConfig			CHOICE {
          s15					INTEGER(0..4),
          s110				INTEGER(0..9),
          s120				INTEGER(0..19),
          s140				INTEGER(0..39), -continued CAI report ARC configuration
In Ts 38.331 v1,0,1, a CSI Report Setting is configured as below:

```
                    s180                    INTEGER(0..79),
                    s1160                   INTEGER(0..159),
                    s1320                   INTEGER(0..319)
            },
            -- Indicates which PUCCH resource to use for reporting on PUCCH.
            pucch-CSI-Resource          PUCCH-CSI-Resource
    },
    semiPersistentPUCCH                 SEQUENCE {
            -- Periodicity and slot offset. Corresponds to L1 parameter 'ReportPeriodibity' and
'ReportSlotOffset'
            -- (see 38.214, section section 5.2.1.4).
            reportSlotConfig            CHOICE {
                    s15                     INTEGER(0..4),
                    s110                    INTEGER(0..9),
                    s120                    INTEGER(0..19),
                    s140                    INTEGER(0..39),
                    s180                    INTEGER(0..79),
                    s1160                   INTEGER(0..159),
                    s1320                   INTEGER(0..319)
            },
            -- Indicates which PUCCH resource to use for reporting on PUCCH.
            pucch-CSI-Resource          PUCCH-CSI-Resource
    },
    semiPersistentPUSCH                 SEQUENCE {
            -- Periodicity. Corresponds to L1 parameter 'Reportperiodicity-spCSI'. (see 38.214,
section FFS_Section)
            reportSlotConfig            ENUMERATED {s15, s110, s120, s140, s180,
s1160, s1320},
            -- RNTI for SP CSI-RNTI, Corresponds to L1 parameter 'SPCSI-RNTI' (see 38.214,
section FFS_Section)
            -- FFS: RAN1 models different RNTIs as different Search Spaces with independent
configurations. Align the configuration
            -- of this one (e.g. group with monitoring periodicity, PDCCH candidate
                configuration, DCI-Payload size . . . )?
            csi-RNTI                    RNTI-Value,
            -- Index of the p0-alpha set determining the power control for this CST report
transmission.
            -- Corresponds to L1 parameter 'SPCSI-p0alpha' (see 38.214, section FFS_Section)
            p0alpha                     P0-PUSCH-AlphaSetId
    },
    aperiodic                           SEQUENCE {
            -- Timing offset Y for aperiodic reporting. This field lists the allowed offset
values. A particular value is indicated in DCI.
            -- (see 38.214, section 5.2.1.1)
            -- FFS_Value: Range wasn't final in RAN1 table.
            -- FFS_FIXME: How are the DCI codepoints mapped to the allowed offsets?
            reportSlotOffset            SEQUENCE (SIZE (1..4)) OF INTEGER (0..8)
    }
},
-- The CSI related euanitdes to report (see 38.214, section REF)
reportQuantity                          CHOICE {
    none                                NULL,
    cri-RI-PMI-CQI                      NULL,
    cri-RI-i1                           NULL,
    cri-RI-i1-CQI                       SEQUENCE {
            -- PRB bundling size to assume for CQI calcuation when reportQuantity is
CRI/RI/i1/CQI
            -- Corresponds to L1 parameter 'PDSCH-bundle-size-for-CSI' (see 38.214, section
FFS_Section)
            pdsch-BundleSizeForCSI          ENUMERATED {n2, n4}    OPTIONAL
    },
    crd-RI-CQI                          NULL,
    cri                                 NULL,
    cri-RSRP                            NULL,
    cri-RI-LI-PMI-CQI                   NULL
},
-- Reporting configuration in the frequency domain (see 38.214, section 5.2.1)
reportFreqConfiguration                 SEQUENCE {
    -- Indicates whether the UE shall report a single (wideband) or multiple (subband) CQI.
(see 38.214, section 5.2.1.4)
    cqi-FormatIndicator                 ENUMERATED {widebandCQI, subbandCQI },
    -- Indicates whether the UE shall report a single (wideband) or multiple (subband) PMI.
(see 38.214, section 5.2.1.4)
    pmi-FormatIndicator                 ENUMERATED {widebandPMI, subbandPMI },
    -- Indicates a contiguous or non-contigous subset o
```

| CAI report ARC configuration |
| In Ts 38.331 v1,0,1, a CSI Report Setting is configured as below: |

```
CSI shall be reported
    -- for. FFS: Each bit in the bit-string represents
bit string represents the
    -- lowest subband in the BWP. (see 38.214, section 5.2.1.4)
    -- FFS: Size of the bitmap. Introduce a CHOICE with
number of subbands in carrier/BWP?
    csi-ReportingBand                     BIT STRING (SIZE (ffsValue))
},
    -- Time domain measurement restriction for the channel (signal) measurements. (see 38.214,
section 5.2.1.1)
    measRestrictionTimeForChannel          ENUMERATED {fffsTypeAndValue},
    -- Time domain measurement restriction for interference measurements. (see 38.214, section
5.2.1.1)
    measRestrictionTimeForInterference     ENUMERATED {ffsTypeAndValue},
    -- Codebook configuration for Type-1 or Type-II including codebook subset restriction
    codebookConfig                         CodebookConfig,
    -- Maximum number of CQIs per CSI report (cf. 1 for 1-CW, 2 for 2-CW)
    nrofCQIsPerReport                      ENUMERATED {n1, n2},
    -- Turning on/of group beam based reporting (see 38.214, section FFS_Section)
    groupBasedBeamReporting                CHOICE {
        enabled                            SEQUENCE {
            -- Number of beams to report for group based beam r
            nrofBeamsToReport              ENUMERATED {ffsTypeAndValue}
        disabled                           SEQUENCE {
            -- The number (N) of measured RS resources to be reported per report setting in a
non-group-based report.
            -- N <= N_max, where N_max is either 2 or 4 depending on UE capability.
            -- FES: The signaling mechanism for the gNB to select a subset of N beams for the UE
to measure and report.
            -- FFS; Note: this parameter may not be needed for certain resource and/or report
settings
            -- FFS_ASN1: Change groupBasedBeamReporting into a
the "no" option?
            -- (see 38.214, section FFS_Section)
            -- When the field is absent the UE applies the value 1
            nrofReportedRS                 ENUMERATED {n1, n2, n3, n4}
        }
    },
    -- Which CQI table to use for CQI calculation. Corresponds to L1 parameter 'CQI-Table' (see
38.214, section FFS_Section)
    -- FFS: Whether URLLC2 should be added as one option
    cqi-Table                              ENUMERATED {qam64, qam256, urllc1, urllc2}
    -- Indicates one out of two possible BWP-dependent values for the subband size
    -- Corresponds to L1 parameter 'SubbandSize' (see 38.214, section FFS_Section)
    -- FFS_Value: Clarify what value1 and value2 mean.
    subbandSize                            ENUMERATED {value1, value2},
    -- BLEA target that the UE shall be assume in its CQI calculation.
    -- Corresponds to L1 parameter 'BLER-Target' (see 38.214, section FES_Section)
    -- FES _Values (now filled with spares)
    bler-Target                            ENUMERATED {zerodot1, spare3, space2, spare1}
    -- Port indication for RI/CQI calculation. For each CSI-RS resource in the linked
ResourceConfig for channel measurement,
    -- a port indication fo each rank R, indicating which R ports to use. Applicable only for
non-PMI feedback.
    -- Corresponds to L1 parameter 'Non-PM -Portindication' (see 38.214, section FFS_Section)
    non-PMI-PortIndication                 FFS_Value
    -- Which DL BWP the CSI-ReportConfig is associated with. (see 38.214, section FFS_Section)
    -- FFS_CHECK: Should it be possible to link a report to several BWPs? If not, shouldn't the
report configuration be in the BWP?
    -- FFS_CHECK: Should it be possible to link a repor
that have?
    bandwidthPartId                        BandwidthPartId
}
```

CSI Reporting on PUCCH

Multiple periodic and/or semi-persistent CSI reports on PUCCH may be active at the same time. Each such CSI report has an associated periodicity and slot offset as well as a PUCCH resource whereon the CSI report is intended to be transmitted. If the PUCCH carrying the CSI report collides (in the time-domain) with a dynamically scheduled PUSCH transmission, the periodic/semi-persistent CSI report is piggybacked on the PUSCH.

Similarly, if the PUCCH carrying a CSI report collides with another PUCCH carrying dynamically scheduled HARQ-ACK or SR, the CSI report is typically piggybacked on the PUCCH resource carrying the HARQ-ACK/SR.

SUMMARY

There currently exist certain challenge(s).
It is possible that several PUCCH-based CSI reports are configured to occur in the same slot so that more than one PUCCH transmission occurrence corresponding to different configuration of CSI reports would collide and overlap in time with a PUCCH transmission carrying HARQ-ACK or SR. In that case, the UE behavior is not clear.

Certain aspects of the present disclosure and their embodiments may provide solutions to these or other challenges.

According to the present invention, there is provided a method performed by a wireless device for prioritizing channel state information reports. The method comprises determining to transmit a portion of a plurality of channel state information reports that are each separately scheduled for transmission responsive to determining that the reports would be transmitted in a same slot with acknowledgement information indicating whether data was successfully or unsuccessfully received by the wireless device. The method further comprises transmitting, by the wireless device in that slot, that portion of the channel state information and the acknowledgement information.

According to the present invention, there is further provided a method performed by a network node. The method comprises receiving, by the network node in a same slot, from a wireless device, at least one prioritized channel state information report selected from a plurality of channel state information reports and acknowledgement information indicating whether data was successfully or unsuccessfully received by the wireless device, wherein each of the plurality of channel state reports and the acknowledgement information is separately scheduled for transmission by the wireless device in the same slot.

According to the present invention, there is further provided a wireless device comprising processing circuitry and memory, the memory containing instructions executable by the processing circuitry whereby the wireless device is configured to determine to transmit a portion of a plurality of channel state information reports that are each separately scheduled for transmission responsive to determining that the reports would be transmitted in a same slot with acknowledgement information indicating whether data was successfully or unsuccessfully received by the wireless device. The wireless device is further configured to transmit, by the wireless device in that slot, that portion of the channel state information and the acknowledgement information.

According to the present invention, there is further provided a base station comprising: processing circuitry and memory, the memory containing instructions executable by the processing circuitry whereby the base station is configured to receive, by the network node in a same slot, from a wireless device, at least one prioritized channel state information report selected from a plurality of channel state information reports and acknowledgement information indicating whether data was successfully or unsuccessfully received by the wireless device, wherein each of the plurality of channel state reports and the acknowledgement Information is separately scheduled for transmission by the wireless device in the same slot.

Advantageously, embodiments of the present invention enable acknowledgement information to be transmitted reliably whilst also conveying a prioritized channel state information report.

In some examples, a set of priority rules depending on the CSI parameters of the colliding CSI reports may be defined such that only one CSI report is piggybacked on the PUCCH resource for HARQ-ACK.

The CSI priority may be determined from parameters in the CSI report configuration for each CSI report.

Certain embodiments may provide one or more of the following technical advantage(s).

HARQ-ACK is transmitted reliably while also conveying the most prioritized CSI report according to a criterion without causing ambiguous UE behavior.

BRIEF DESCRIPTION OF THE DRAWINGS

Embodiments of the present will now be described by way of example only and with reference to the accompanying drawings, in which:

FIG. 9 shows a method performed by a network node according to an embodiment;

DETAILED DESCRIPTION

Figure 1:
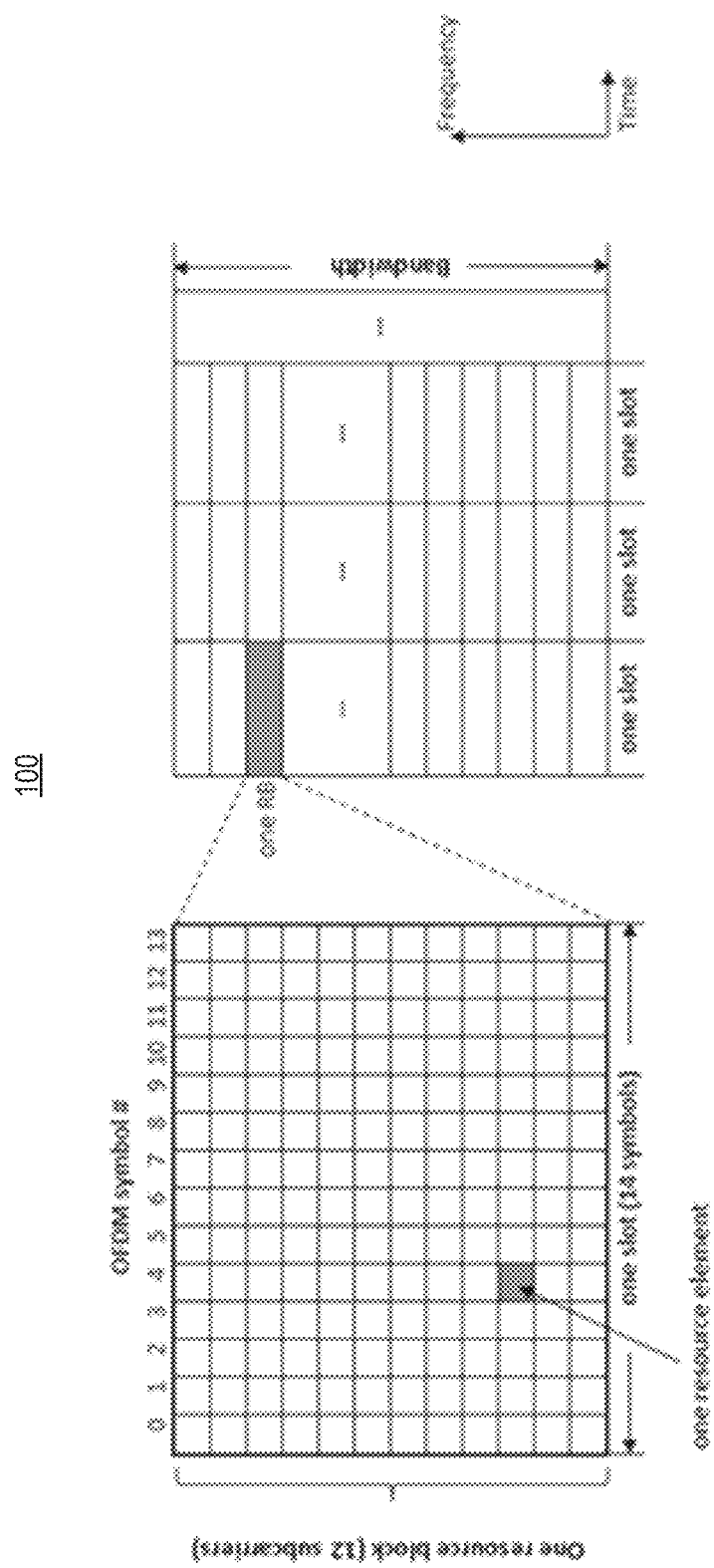
FIG. 1 is an example of NR physical resources.
Figure 2:
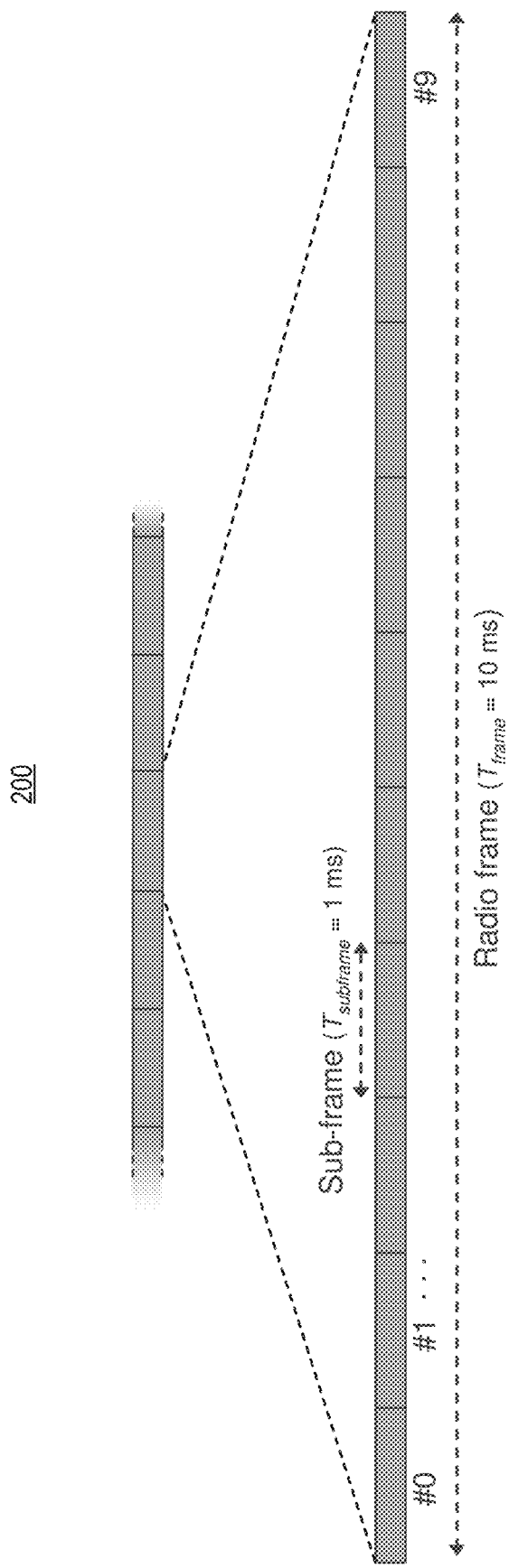
FIG. 2 shows NR time-domain structure with 15 kHz subcarrier spacing.
Figure 3:
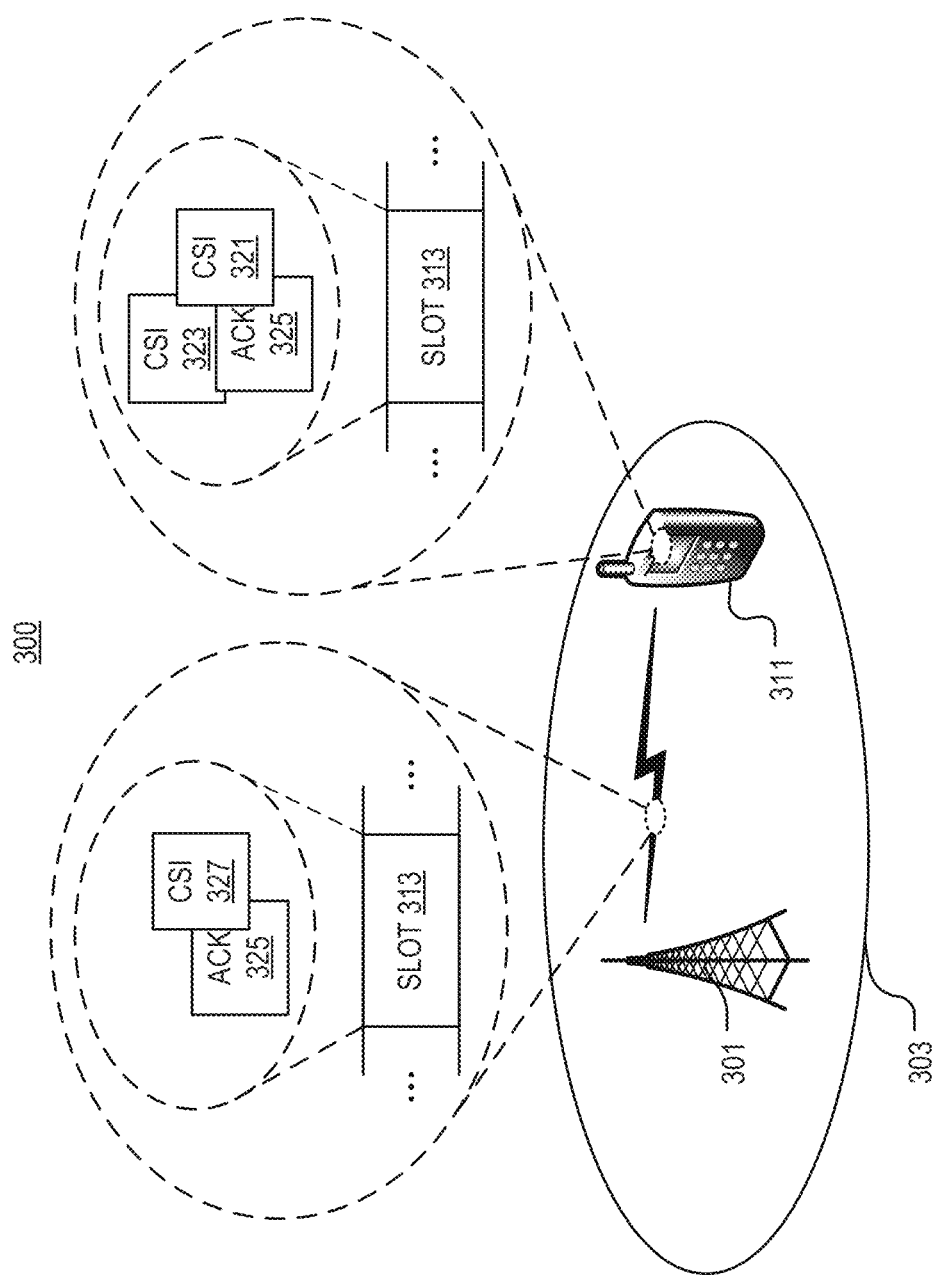
FIG. 3 illustrate a system for prioritizing channel state information reports according to an embodiment.

In one embodiment, FIG. 3 illustrates one embodiment of a system 300 for prioritizing channel state information reports in accordance with various aspects as described herein. In FIG. 3, the system 300 may include a network node 301 (e.g., base station, gNB) and a wireless device 311 (e.g., UE). In one embodiment, the network node 301 may be associated with a cell 303. In one example, a cell is a carrier in a sector of a base station. The wireless device 311 determines that multiple channel state information reports 321, 323 (each report separately scheduled for transmission) are separately scheduled for transmission in a same slot 313 (or at least one symbol of the slot 313) with acknowledgement information 325 that indicates whether data was successfully or unsuccessfully received by the wireless device 311. In response, the wireless device 311 determines to transmit a portion 327 of these multiple channel state information reports 321, 323. The wireless device 311 then transmits the portion 327 of these reports 321, 323 and the acknowledgement information 325 in the same slot 313.

In another embodiment, the wireless device 311 selects the portion 327 of the reports 321, 323 according to a prioritization criterion. This prioritization criterion may be based on one or more of the following characteristics associated with a channel state information report: a payload size, a time domain behavior, a transmission periodicity, a frequency granularity, a type, a channel quality, a channel state information report parameter, a channel state information report identifier, and the like.

In one embodiment, the network node 301 receives, in the same slot 313, from the wireless device 311, at least one prioritized channel state information report 327 and acknowledgement information 325 indicating whether data was successfully or unsuccessfully received by the wireless device 311. Further, each report 321, 323 and the acknowledgement information 325 is separately scheduled for transmission by the wireless device in the same slot 313.

In FIG. 3, the network node 301 may be configured to support one or more communication systems such as LTE, UMTS, GSM, NB-IoT, 5G New Radio (NR), the like, or any combination thereof. Further, the network node 301 may be a base station, an access point, or the like. Also, the network node 301 may serve wireless device 311. The wireless device 311 may be configured to support one or more communication systems such as LTE, UMTS, GSM, NB-IoT, 5G NR, the like, or any combination thereof.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
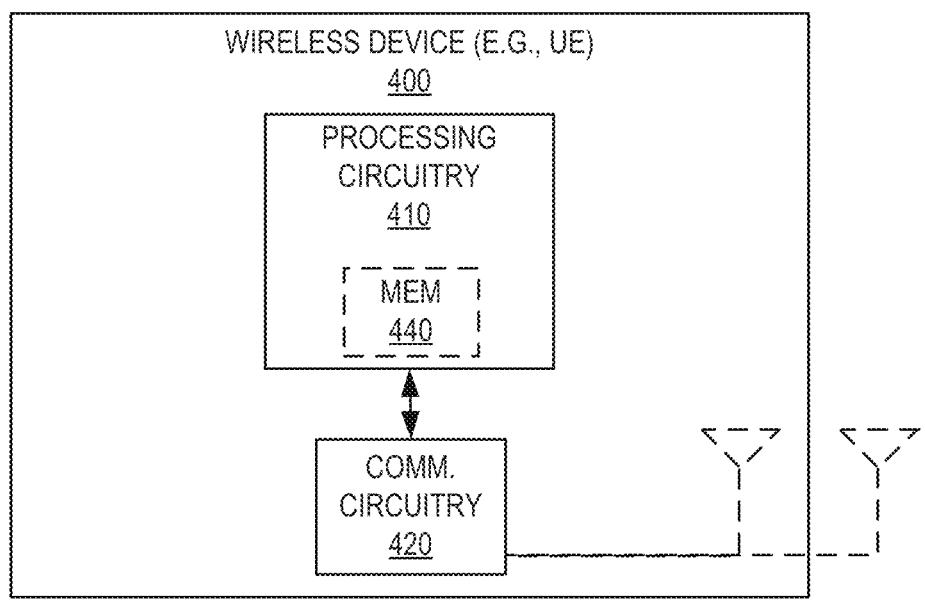
FIG. 4 illustrates a wireless device according to an embodiment.

For example, FIG. 4 illustrates one embodiment of a wireless device 400 in accordance with various embodiments described herein. As shown, the wireless device 400 includes processing circuitry 410 and communication circuitry 420. The communication circuitry 420 (e.g., radio circuitry) is configured to transmit and/or receive information to and/or from one or more other nodes, e.g., via any communication technology. Such communication may occur via one or more antennas that are either internal or external to the wireless device 400. The processing circuitry 410 is configured to perform processing described above and or below, such as by executing instructions stored in memory 430. The processing circuitry 410 in this regard may implement certain functional means, units, or modules.

Figure 5:
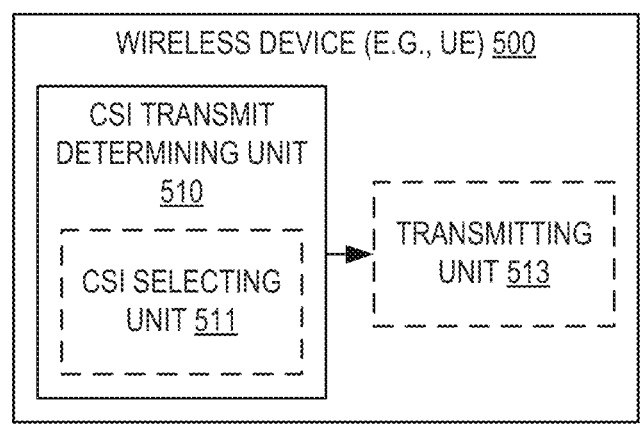
FIG. 5 is a schematic block diagram of a wireless device according to an embodiment.
Figure 12:
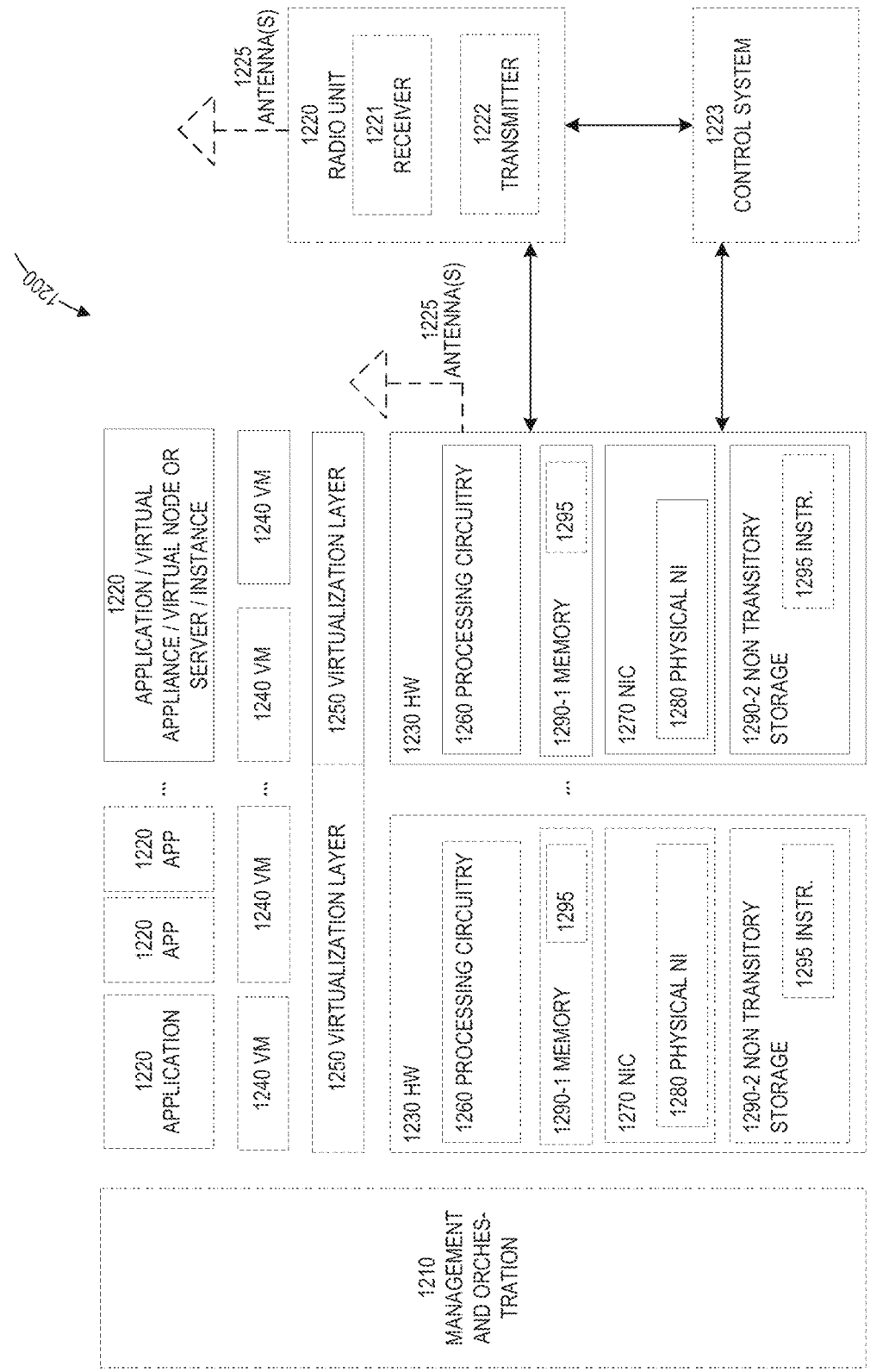
FIG. 12 is a schematic block diagram illustrating a virtualisation environment in which functions implemented by some embodiments may be virtualized.

FIG. 5 illustrates a schematic block diagram of one embodiment of a wireless device 600 in a wireless network in accordance various embodiments described herein (for example, the wireless network shown in FIG. 3 and FIG. 12). As shown, the wireless device 500 implements various functional means, units, or modules, e.g., via the processing circuitry 410 in FIG. 4 and/or via software code. In one embodiment, these functional means, units, or modules, e.g., for implementing the method(s) herein, may include for instance: a CSI transmit determining unit 611 for determining to transmit a portion of a plurality of channel state information reports that are each separately scheduled for transmission responsive to determining that the reports would be transmitted in a same slot with acknowledgement information indicating whether data was successfully or unsuccessfully received by the wireless device, a CSI selecting unit 513 for selecting the portion of the channel state information reports according to a prioritization criterion, and transmitting unit 515 for transmitting, by the wireless device in that slot, that portion of the channel state information and the acknowledgement information.

Figure 6:
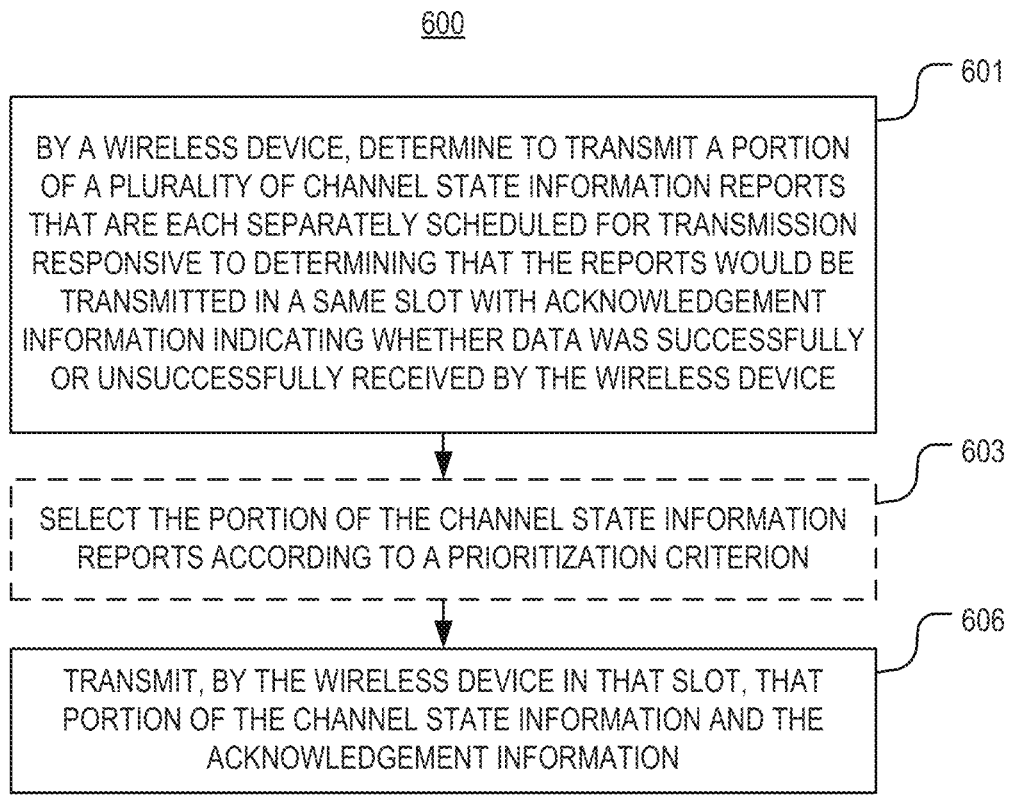
FIG. 6 shows a method performed by a wireless device according to an embodiment.

FIG. 6 illustrates one embodiment of a method 600 performed by a wireless device for in accordance with various embodiments described herein. In FIG. 6, the method 600 may start, for instance, at block 601 where it includes determining to transmit a portion of a plurality of channel state information reports that are each separately scheduled for transmission, responsive to determining that the reports would be transmitted in a same slot with acknowledgement information indicating whether data was successfully or unsuccessfully received by the wireless device. Further, at block 603, the method 600 may include selecting the portion of the channel state information reports according to a prioritization criterion. Also, at block 606, the method 600 includes transmitting, by the wireless device in that slot, that portion of the channel state information and the acknowledgement information.

Block 601 may comprise determining not to transmit at least one of the plurality of channel state information reports.

The prioritization criterion may be associated with a parameter of a channel state information report. The parameter may be Report Signal Received Power, RSRP. The prioritization criterion may depend on whether a channel state information report reports RSRP. [VDK1] In addition or alternatively, the prioritization criterion may be associated with an identifier of a channel state information report. In addition or alternatively, the prioritization criterion may be associated with a time-domain behavior of a channel state information report.

Block 601 may comprise determining that each report would be transmitted on at least one same symbol of the slot, whereon the acknowledgment information would also be transmitted.

Each of the plurality of channel state information reports may be scheduled for transmission on a respective Physical Uplink Control Channel, PUCCH.

Each of the plurality of channel state information reports may be a periodic and/or semi-persistent channel state information report.

The acknowledgement information may be a Hybrid Automatic Repeat Request Acknowledgement, HARQ-ACK.

Block 601 may comprise determining that at least two PUCCH resources each conveying a respective one or more of the channel state information reports overlap with a dynamically scheduled PUCCH conveying HARQ-ACK.

Figure 7:
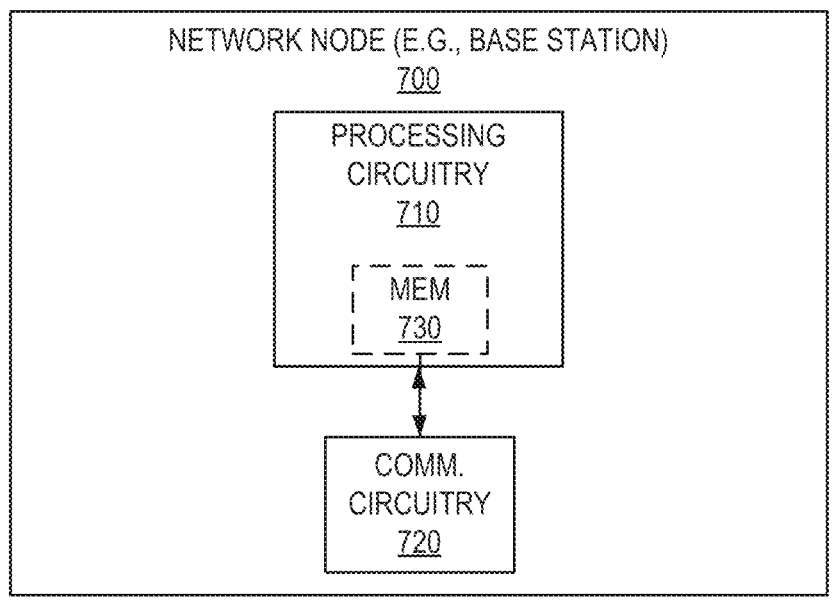
FIG. 7 illustrates a network node according to an embodiment.

FIG. 7 illustrates a network node 700 as implemented in accordance various embodiments described herein. As shown, the network node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, such as by executing instructions stored in memory 730. The processing circuitry 710 in this regard may implement certain functional means, units, or modules.

Figure 8:
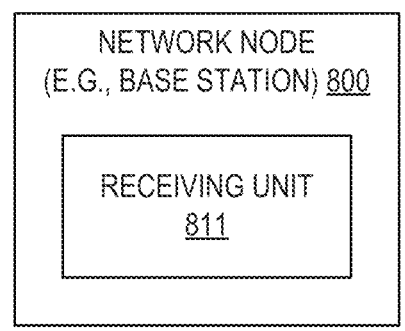
FIG. 8 is a schematic block diagram of a network node according to an embodiment.

FIG. 8 illustrates a schematic block diagram of one embodiment of a network node 800 in a wireless network in accordance various embodiments described herein (for example, the network node shown in FIG. 3 and FIG. 12). As shown, the network node 800 implements various functional means, units, or modules, e.g., via the processing circuitry 710 in FIG. 7 and/or via software code. In one embodiment, these functional means, units, or modules, e.g., for implementing the method(s) herein, may include for instance: a receiving unit 811 for receiving, by the network node in a same slot, from a wireless device, at least one prioritized channel state information report selected from a plurality of channel state information reports and acknowledgement information indicating whether data was successfully or unsuccessfully received by the wireless device. Also, each of the plurality of channel state information reports report and the acknowledgement information is separately scheduled for transmission by the wireless device in the same slot.

FIG. 9 illustrates one embodiment of a method 900 performed by a network node for prioritizing channel state information reports in accordance with various embodiments described herein. In FIG. 9, the method 900 includes at block 901 receiving, by the network node in a same slot, from a wireless device, at least one prioritized channel state information report and acknowledgement information indicating whether data was successfully or unsuccessfully received by the wireless device. Also, each of the plurality of channel state information reports report and the acknowledgement information is separately scheduled for transmission by the wireless device in the same slot.

The method may further include at block 902 separately scheduling the plurality of channel state information reports for transmission by the wireless device.

The at least one prioritized channel state information report may be selected from a plurality of channel state information based on a prioritization criterion.

The at least one prioritized channel state information report may be received based on a prioritization criterion.

The prioritization criterion may be associated with a time-domain behavior of a channel state information report. In addition or alternatively the prioritization criterion may be associated with a parameter of a channel state information report. The parameter may be Report Signal Received Power, RSRP. In addition or alternatively the prioritization criterion may be associated with an identifier of a channel state information report.

Block 901 may comprise the receiving on at least one symbol of the slot.

Each of the plurality of channel state information reports may be scheduled for transmission on a respective Physical Uplink Control Channel, PUCCH.

The acknowledgement information may be a Hybrid Automatic Repeat Request Acknowledgement, HARQ-ACK.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

A UE may be configured with multiple periodic and/or semi-persistent CSI reports on PUCCH such that they may occur in the same slot. In some cases, the PUCCH resources of the respective reports may collide, i.e. overlap in time. When such a case occur, transmissions may be dropped so that only one of the colliding CSI reports are transmitted, or alternatively, one transmission is piggybacked to the other transmission such that only a single physical channel is transmitted whereon multiple CSI reports are mapped. Which reports shall be dropped and which shall be transmitted may depend on priority order ranking the different configured reports from low to high priority.

A particularly interesting case is when two or more PUCCH resources each conveying one or more CSI reports overlap with a dynamically scheduled PUCCH conveying HARQ-ACK in a slot. In that case, the UE can transmit UCI on a PUCCH resource in that slot that includes in addition to HARQ-ACK information, the CSI reports and possibility the SR. In case of multiple CSI reports corresponding to different CSI reporting configuration, it may be desirable to only piggyback one of the CSI reports conveyed in the by the PUCCH resource for HARQ-ACK colliding PUCCH resources, as otherwise the reliability of the HARQ-ACK may be compromised. In embodiments herein, which CSI report is piggybacked is determined according to priority rules. The non-prioritized CSI reports may be dropped for that PUCCH transmission and the corresponding reporting can be postponed to the next respective transmission occasion.

In some embodiments, priority rules depend on CSI payload size such that a CSI report with a smaller CSI payload has priority over a CSI report with larger CSI payload such that the CSI report which can be received more reliably is prioritized. Alternatively, a CSI report with larger payload size has priority over a CSI report with a smaller payload size such that the CSI report with the most content has priority.

In other embodiments, the priority rules depend on time-domain behavior of the CSI report, for instance defined by the reportConfigType IE, such that a semi-persistent report has priority over a periodic report, such that the report which has required dynamic L2 activation signaling over MAC CE has priority over the report that only require RRC L3 activation.

In yet other embodiments, the priority rules depend on the periodicity of the CSI report such that a CSI report which is transmitted with longer periodicity as has priority over a CSI report which is transmitted with shorter periodicity such that the report which the gNB would have to wait longer if dropped is transmitted. Alternatively, the CSI report with shorter periodicity has priority such that the CSI content which may be more short-lived has priority and is transmitted. The periodicity may for instance be determined by the reportSlotConfig IE.

In other embodiments, the priority rules depend on the frequency-granularity of the report. For instance, if wideband CQI/PMI is used or not (as may be defined by cqi-FormatIndicator and pmi-FormatIndicator). In some such embodiments, the CSI report with wideband CQI and/or PMI has priority such that the more coarse CSI content which may be used more reliably in case of poor channel estimation quality at the UE has priority. Alternatively, the CSI report with subband PMI and or CQI has priority such that the more fine granular CSI relaying the most CSI content is prioritized.

In yet other embodiments, the priority rules depend on CSI Type, such as Type I or Type II which may be identified by the codebookConfig IE. In that case Type I CSI may have priority over Type II CSI as Type I CSI is typically used for fallback transmissions.

In further embodiments, the CSI report which is configured with the lowest BLER target (using for instance the bler-Target IE) for CQI calculation purpose has priority such that the CSI intended for the most reliable transmission is conveyed.

In further embodiments, the priority rule depends on the reported CSI parameters, as defined by the reportQuantity IE. For instance, reports comprising beam reports as given by reportQuantity=cri-RSRP or reportQuantity=cri has priority over other content, as beam reporting indicates which anlogue beamforming to use while other CSI content indicates digital preocding and/or link adaption which typically is dependent on which analogue beamforming is used.

In yet other embodiments, the priority rules depend on the unique repoRtConfigId such that a report with smaller or larger ID has priority. The benefit with this approach is that there never would be any ambiguity around which report has priority as two reports can never have the same reportConfigId.

Any of the rules as described by the above embodiments may be used in conjunction with each other in some embodiments. For instance, a list of rules {Rule #1, Rule #2, . . . } may be used. In a first step, the priority order of two CSI reports are determined by Rule #1. If Rule #1 does not assign different priorities for the two reports (for instance if the two reports have the same periodicity, the same CSI payload size, etc. . . . ) the priority is as a second step determined by Rule #2, and so forth. For instance, the priority may in one embodiment be determined first by which CSI report has longest periodicity, second by which CSI report has the lowest reportConfigId. As the reportConfigId is unique, this list of rules can always assign different priorities for any possible set of CSI reports without ambiguity, which is a desirable effect.

Figure 10:
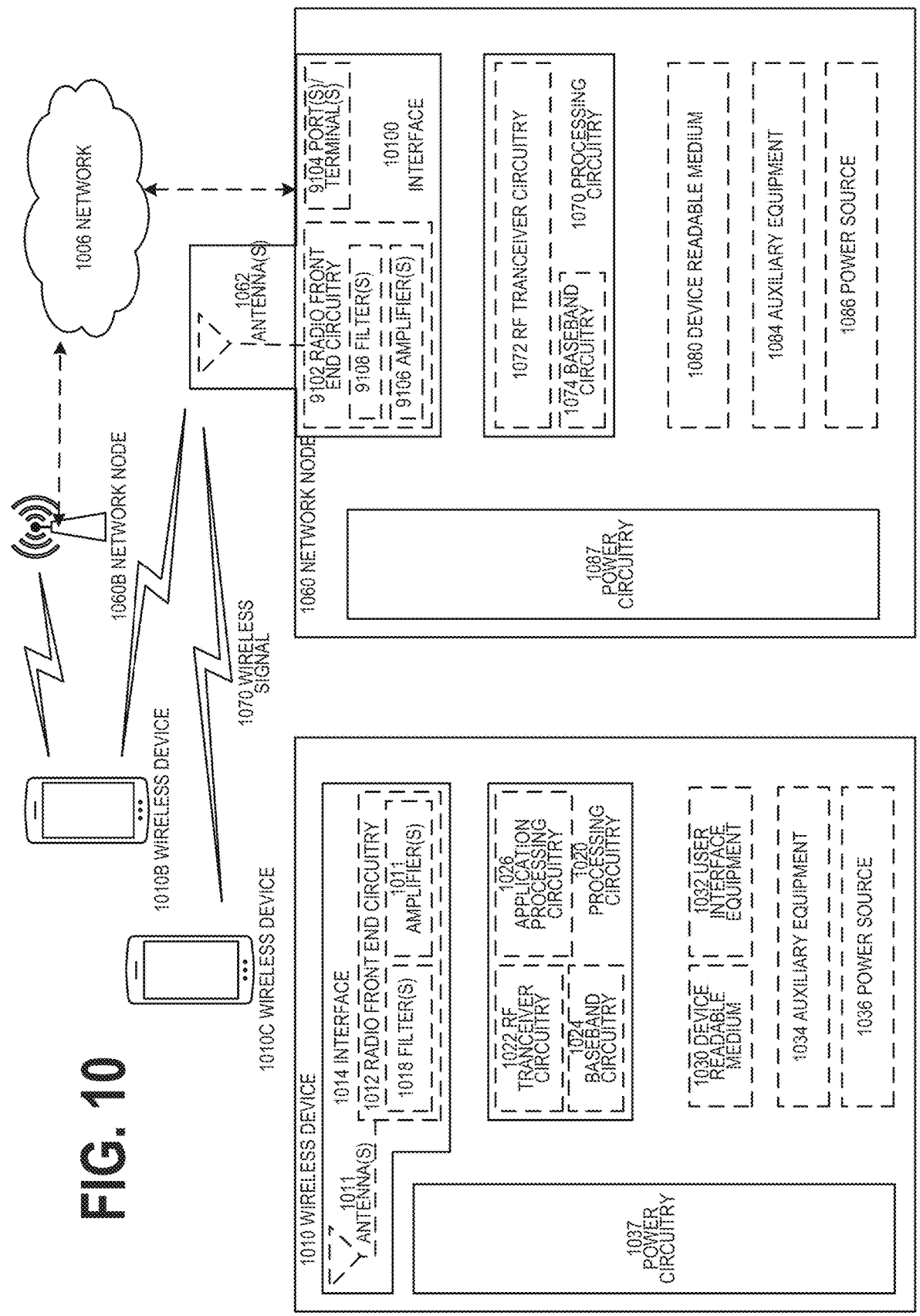
FIG. 10 illustrates a wireless network.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060b, and WDs 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards: and/or any other appropriate wireless communication standard, such as the Worldwide Interoperability for Microwave Access (WiMax), Bluetooth. Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1060, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1060 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1060 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1060 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicleto-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-loT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, NB-loT, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being performed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being performed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032. WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 11:
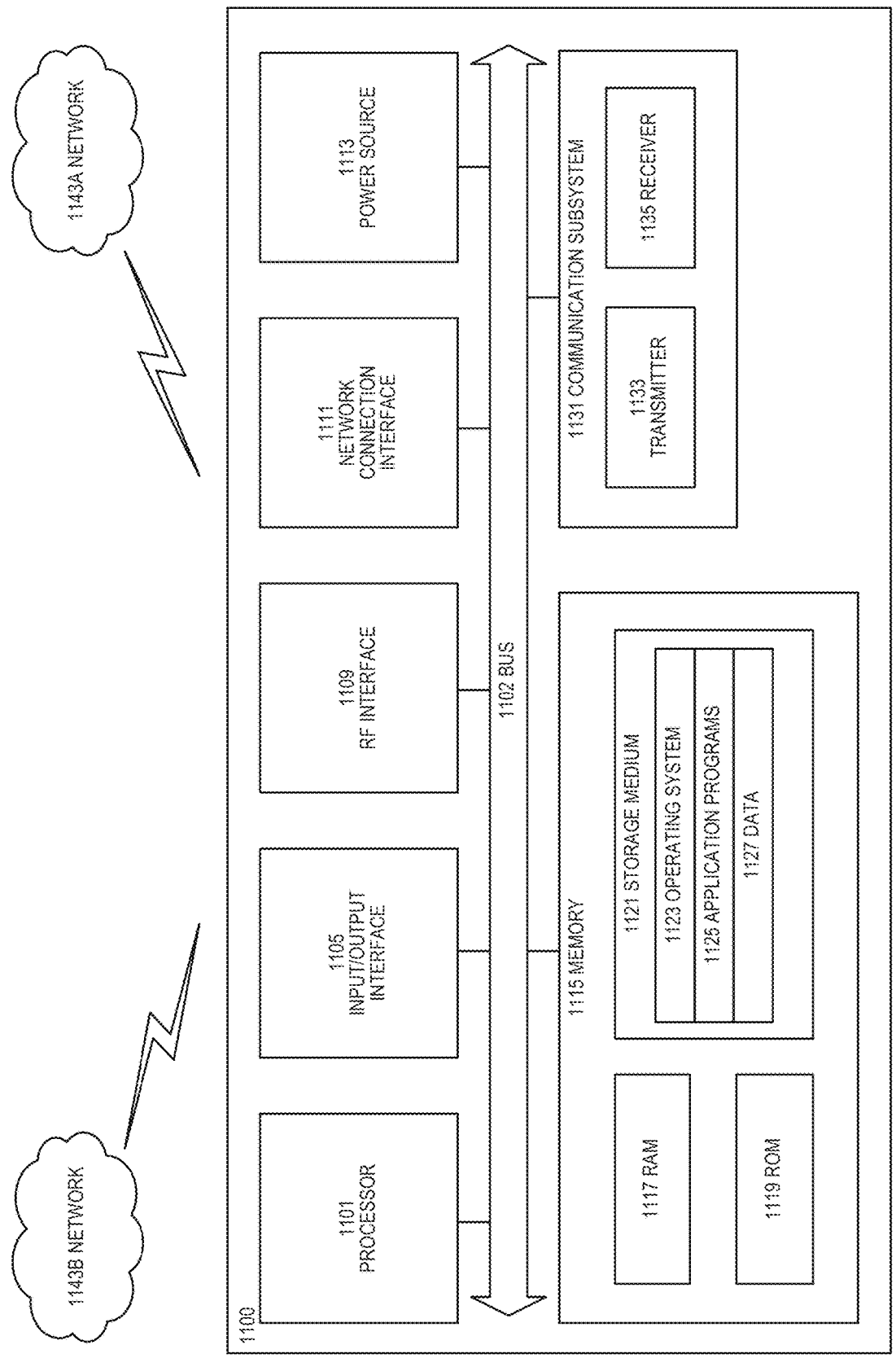
FIG. 11 illustrates a UE.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1120 may be any UE identified by the $3^{rd}$ Generation Partnership Project (3GPP), including a NB-IoT UE, a machine type communication (MTC) UE, and/or an enhanced MTC (eMTC) UE. UE 1100, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1106 may be configured to provide a communication interface to an input device, output device, or input and output device. UE 1100 may be configured to use an output device via input/output interface 1106. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1106 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network 1143$a$. Network 1143$a$ may encompass wired and/or wireless networks such as a local-area network (LAN), a wide-area network (WAN), a computer network, a wireless network, a telecommunications network, another like network or any combination thereof. For example, network 1143$a$ may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory.

Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network 1143$b$ using communication subsystem 1131. Network 1143$a$ and network 1143$b$ may be the same network or networks or different network or networks. Communication subsystem 1131 may be configured to include one or more transceivers used to communicate with network 1143$b$. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143$b$ may encompass wired and/or wireless networks such as a local-area network (LAN), a wide-area network (WAN), a computer network, a wireless network, a telecommunications network, another like network or any combination thereof. For example, network 1143$b$ may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

FIG. 12 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 12, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 1210, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 12.

In some embodiments, one or more radio units 1220 that each include one or more transmitters 1222 and one or more receivers 1221 may be coupled to one or more antennas 1225. Radio units 1220 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 1223 which may alternatively be used for communication between the hardware nodes 1230 and radio units 1220.

Figure 13:
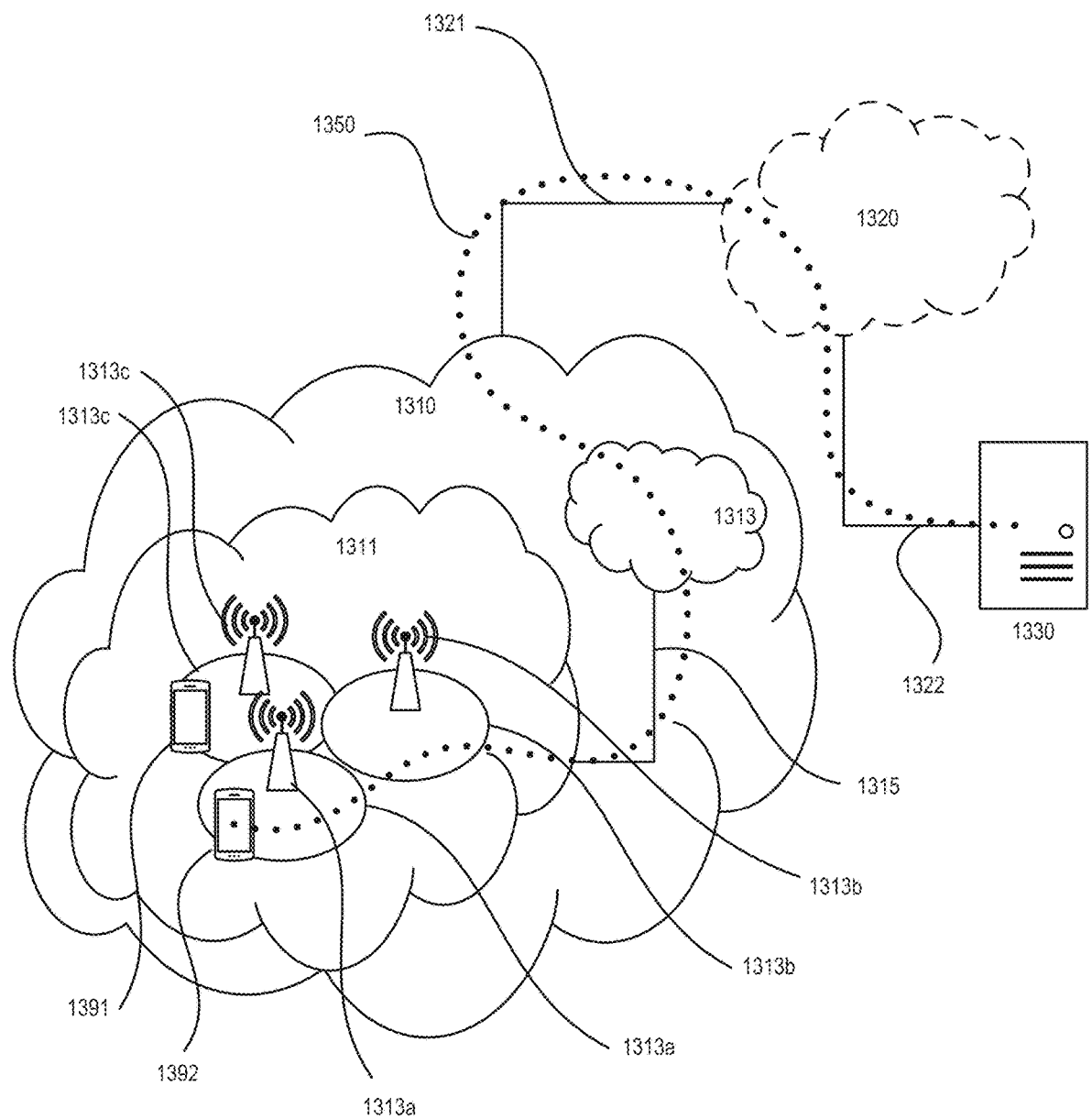
FIG. 13 illustrates a telecommunications network.

FIG. 13 illustrates a telecommunication network connected via an intermediate network to a host computer in accordance with some embodiments. In particular, with reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1360 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 14:
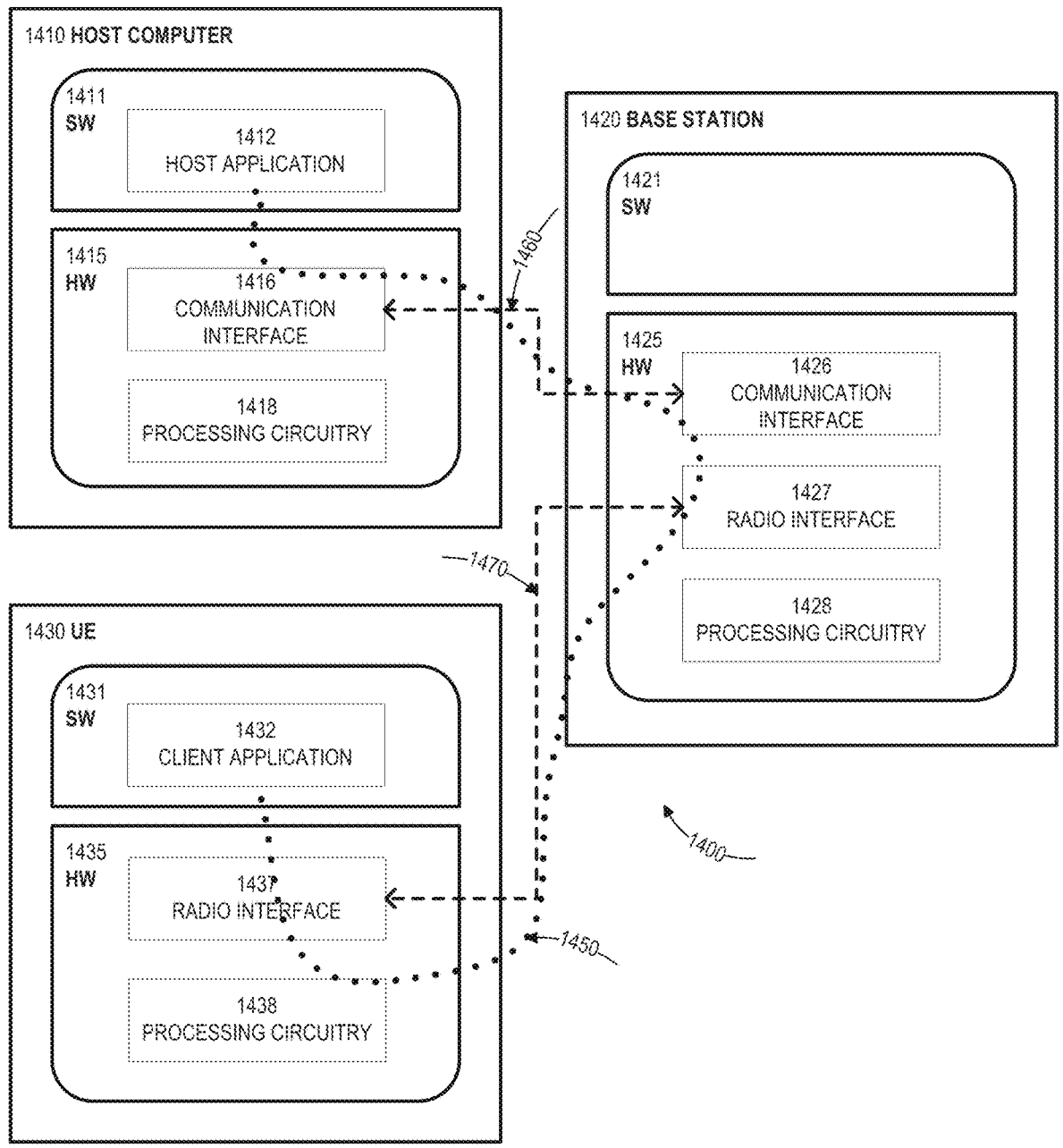
FIG. 14 illustrates a host computer communicating via a base station with a user equipment in accordance with some embodiments.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1400, host computer 1410 comprises hardware 1416 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1460 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1426 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 14) served by base station 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1426, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1460 may transfer both the request data and the user data. Client application 1432 may interact with the user to generate the user data that it provides.

It is noted that host computer 1410, base station 1420 and UE 1430 illustrated in FIG. 14 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 14 and independently, the surrounding network topology may be that of FIG. 14.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
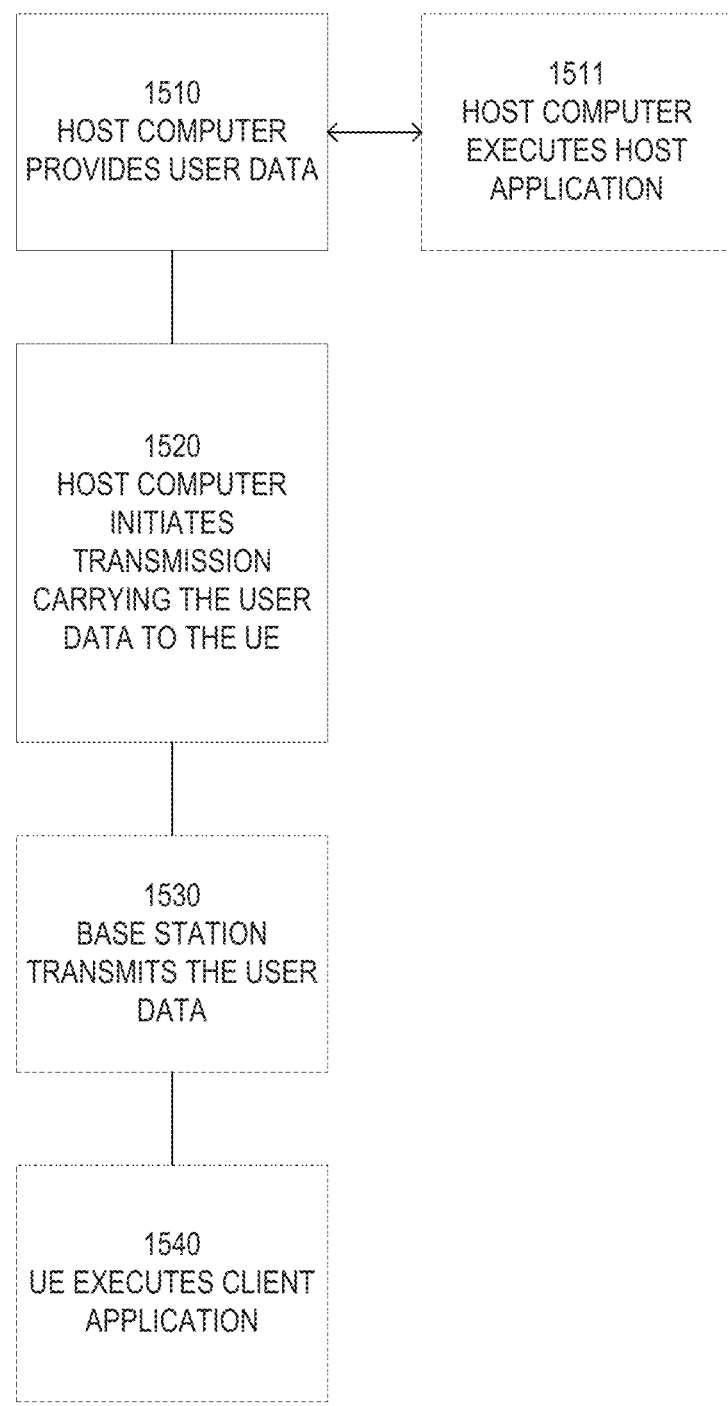
FIG. 15 shows a method implemented in a communication system according to an embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 16:
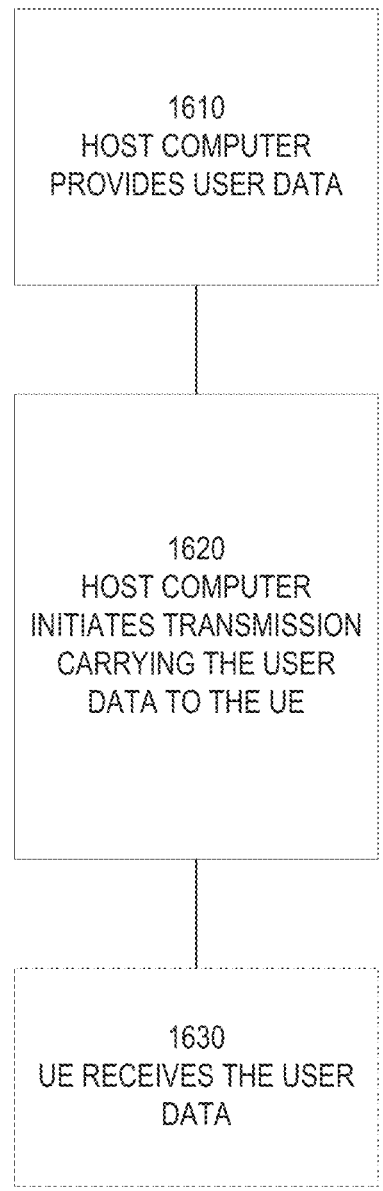
FIG. 16 shows a method implemented in a communication system according to an embodiment.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 17:
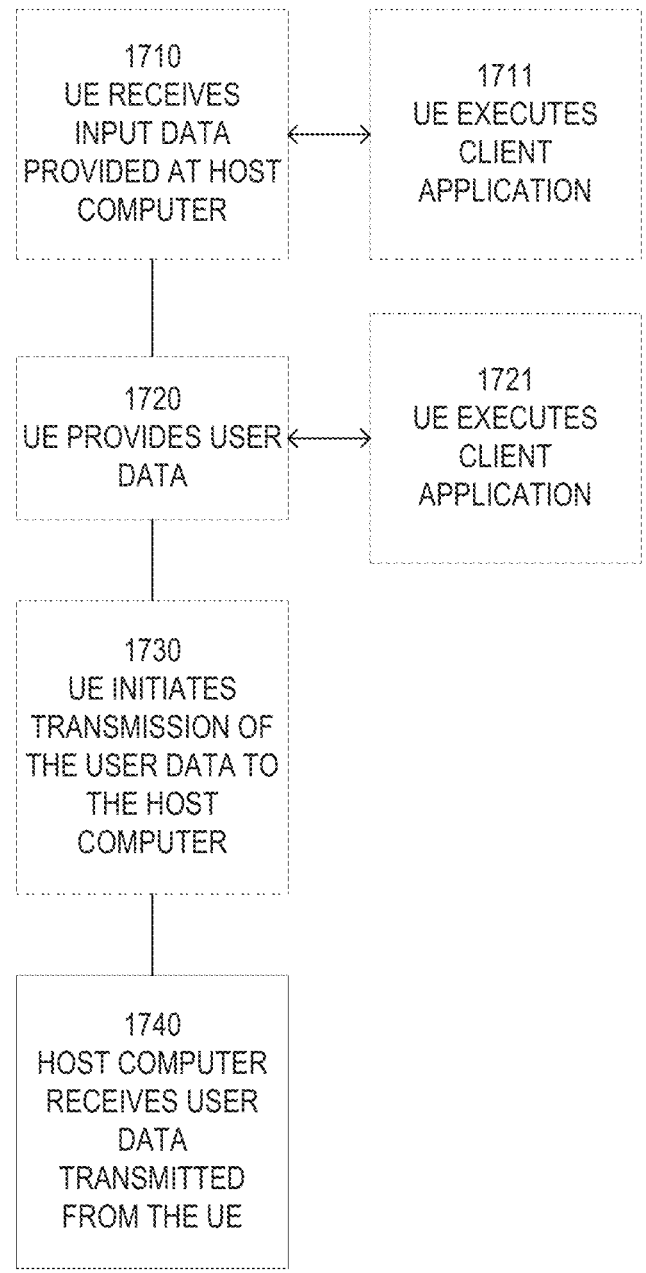
FIG. 17 shows a method implemented in a communication system according to an embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 18:
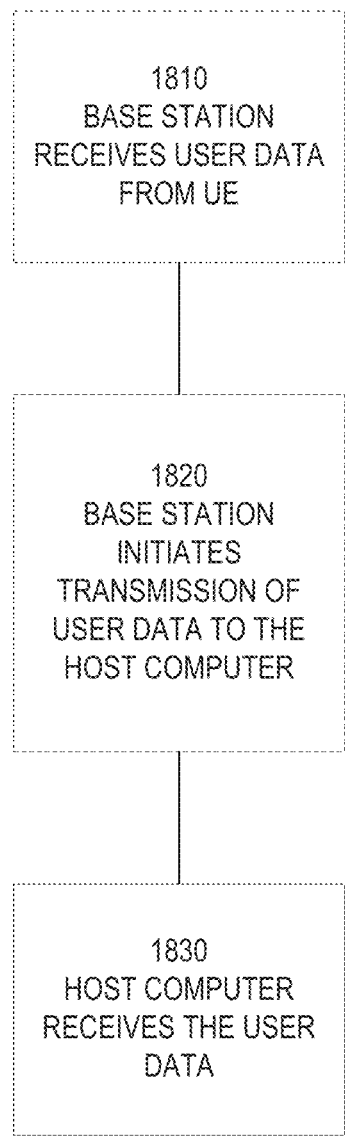
FIG. 18 shows a method implemented in a communication system according to an embodiment.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

According to an embodiment a method performed by a wireless device for prioritizing channel state information reports comprises determining to transmit a portion of a plurality of channel state information reports that are each separately scheduled for transmission responsive to determining that the reports would be transmitted in a same slot with acknowledgement information indicating whether data was successfully or unsuccessfully received by the wireless device. The method further comprises transmitting, by the wireless device in that slot, that portion of the channel state information and the acknowledgement information.

Said determining to transmit the portion may include determining not to transmit at least one of the plurality of channel state information reports.

Said determining to transmit the portion may include selecting the portion of the channel state information reports according to a prioritization criterion.

The prioritization criterion may be associated with a payload size of a channel state information report.

The prioritization criterion may be associated with a time-domain behavior of a channel state information report.

The prioritization criterion may be associated with a periodicity of a channel state information report.

The prioritization criterion may be associated with a frequency granularity of a channel state information report.

The prioritization criterion may be associated with a type of channel state information.

The prioritization criterion may be associated with channel quality information associated with or indicated by a channel state information report.

The channel quality may correspond to a block error rate.

The prioritization criterion may be associated with a parameter of a channel state information report.

The prioritization criterion may be associated with an identifier of a channel state information report.

Said determining that the reports would be transmitted in the same slot with acknowledgement information may be associated with a default transmission or reporting rule that does not limit transmissions of the plurality of channel state information reports that are each separately scheduled for transmission.

Said determining to transmit the portion may include determining that each report would be transmitted on at least one symbol of the slot as the acknowledgment information.

The method may further comprise providing user data; and forwarding the user data to a host computer via the transmission to a network node.

According to an embodiment a method performed by a network node for prioritizing channel state information reports comprises receiving, by the network node in a same slot, from a wireless device, at least one prioritized channel state information report and acknowledgement information indicating whether data was successfully or unsuccessfully received by the wireless device, wherein each report and the acknowledgement information is separately scheduled for transmission by the wireless device in the same slot.

The at least one prioritized channel state information report may be selected from a plurality of channel state information reports.

The at least one prioritized channel state information report may be selected from a plurality of channel state information based on a prioritization criterion.

The prioritization criterion may be associated with a payload size of a channel state information report.

The prioritization criterion may be associated with a time-domain behavior of a channel state information report.

The prioritization criterion may be associated with a periodicity of a channel state information report.

The prioritization criterion may be associated with a frequency granularity of a channel state information report.

The prioritization criterion may be associated with a type of channel state information.

The prioritization criterion may be associated with channel quality information associated with or indicated by a channel state information report.

The channel quality information may include a block error rate.

The prioritization criterion may be associated with a parameter of a channel state information report.

The prioritization criterion is associated with an identifier of a channel state information report.

Said receiving may be on at least one symbol of the slot.

The method may further comprise obtaining user data and forwarding the user data to a host computer or a wireless device.

According to an embodiment a wireless device is configured to perform any of the steps performed by a wireless device described above.

According to an embodiment a wireless device comprises: processing circuitry configured to perform any of the steps performed by a wireless device described above; and power supply circuitry configured to supply power to the wireless device.

According to an embodiment a wireless device comprises: processing circuitry and memory, the memory containing instructions executable by the processing circuitry whereby the wireless device is configured to perform any of the steps performed by a wireless device described above.

According to an embodiment a user equipment (UE) comprises: an antenna configured to send and receive wireless signals; radio front-end circuitry connected to the antenna and to processing circuitry, and configured to condition signals communicated between the antenna and the processing circuitry; the processing circuitry being configured to perform any of the steps performed by a wireless device described above; an input interface connected to the processing circuitry and configured to allow input of information into the UE to be processed by the processing circuitry; an output interface connected to the processing circuitry and configured to output information from the UE that has been processed by the processing circuitry;
and a battery connected to the processing circuitry and configured to supply power to the UE.

According to an embodiment a computer program comprises instructions which, when executed by at least one processor of a wireless device, causes the wireless device to carry out the steps performed by a wireless device described above.

According to an embodiment a carrier contains the computer program, wherein the carrier is one of an electronic signal, optical signal, radio signal, or computer readable storage medium.

According to an embodiment a base station is configured to perform any of the steps performed by base station described above.

According to an embodiment a base station comprises: processing circuitry configured to perform any of the steps performed by a base station described above; power supply circuitry configured to supply power to the wireless device.

According to an embodiment a base station comprises: processing circuitry and memory, the memory containing instructions executable by the processing circuitry whereby the base station is configured to perform any of the steps performed by a base station described above.

According to an embodiment a computer program comprises instructions which, when executed by at least one processor of a base station, causes the base station to carry out the steps performed by a base station described above.

According to an embodiment a carrier contains the computer program, wherein the carrier is one of an electronic signal, optical signal, radio signal, or computer readable storage medium.

According to an embodiment a communication system includes a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps performed by a base station described above.

The communication system may further include the base station.

The communication system may further include the UE, wherein the UE is configured to communicate with the base station.

The processing circuitry of the host computer may be configured to execute a host application, thereby providing the user data; and the UE may comprise processing circuitry configured to execute a client application associated with the host application.

According to an embodiment there is a method implemented in a communication system including a host computer, a base station and a user equipment (UE), the method comprising: at the host computer, providing user data: and at the host computer, initiating a transmission carrying the user data to the UE via a cellular network comprising the base station, wherein the base station performs any of the steps performed by a base station described above.

The method may further comprise, at the base station, transmitting the user data.

The user data may be provided at the host computer by executing a host application, the method further comprising, at the UE, executing a client application associated with the host application.

According to an embodiment a user equipment (UE) is configured to communicate with a base station, the UE comprising a radio interface and processing circuitry configured to perform any of the above embodiments.

According to an embodiment a communication system including a host computer comprises: processing circuitry configured to provide user data; and a communication interface configured to forward user data to a cellular network for transmission to a user equipment (UE), wherein the UE comprises a radio interface and processing circuitry, the UE's components configured to perform any of the steps performed by a wireless device described above.

The cellular network may further include a base station configured to communicate with the UE.

The processing circuitry of the host computer may be configured to execute a host application, thereby providing the user data; and the UE's processing circuitry is configured to execute a client application associated with the host application.

According to an embodiment there is a method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps performed by a wireless device described above.

The method may further comprise at the UE, receiving the user data from the base station.

According to an embodiment a communication system including a host computer comprises: communication interface configured to receive user data originating from a transmission from a user equipment (UE) to a base station, wherein the UE comprises a radio interface and processing circuitry, the UE's processing circuitry configured to perform any of the steps performed by a wireless device described above.

The communication system may further include the UE.

The communication system may further including the base station, wherein the base station comprises a radio interface configured to communicate with the UE and a communication interface configured to forward to the host computer the user data carried by a transmission from the UE to the base station.

The processing circuitry of the host computer may be configured to execute a host application; and the UE's processing circuitry is configured to execute a client application associated with the host application, thereby providing the user data.

The processing circuitry of the host computer may be configured to execute a host application, thereby providing request data; and the UE's processing circuitry is configured to execute a client application associated with the host application, thereby providing the user data in response to the request data.

According to an embodiment there is a method implemented in a communication system including a host computer, a base station and a user equipment (UE), the method comprising: at the host computer, receiving user data transmitted to the base station from the UE, wherein the UE performs any of the steps performed by a wireless device described above.

The method may further comprising, at the UE, providing the user data to the base station.

The method may further comprising: at the UE, executing a client application, thereby providing the user data to be transmitted; and at the host computer, executing a host application associated with the client application.

The method may further comprising: at the UE, executing a client application; and at the UE, receiving input data to the client application, the input data being provided at the host computer by executing a host application associated with the client application, wherein the user data to be transmitted is provided by the client application in response to the input data.

According to an embodiment there is a communication system including a host computer comprising a communication interface configured to receive user data originating from a transmission from a user equipment (UE) to a base station, wherein the base station comprises a radio interface and processing circuitry, the base station's processing circuitry configured to perform any of the steps performed by a base station described above.

The communication system may further include the base station.

The communication system may further include the UE, wherein the UE is configured to communicate with the base station.

The processing circuitry of the host computer may be configured to execute a host application; the UE is configured to execute a client application associated with the host application, thereby providing the user data to be received by the host computer.

According to an embodiment there is a method implemented in a communication system including a host computer, a base station and a user equipment (UE), the method comprising: at the host computer, receiving, from the base station, user data originating from a transmission which the base station has received from the UE, wherein the UE performs any of the steps performed by a wireless device described above.

The method may further comprising at the base station, receiving the user data from the UE.

The method may further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
|---|---|
| CBG | Code Block Group |
| CSI | Channel Slate Information |
| HARQ | Hybrid Automatic Repeat Request |
| MCS | Modulation and Coding Scheme |
| MIMO | Multiple Input Multiple Output |
| PDSCH | Physical Shared Data Channel |
| PUCCH | Physical Uplink Control Channel |
| PUSCH | Physical Uplink Shared Channel |
| SR | Scheduling Request |
| UCI | Uplink Control Information |
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDMA | Code Division Multiplexing Access |
| CGI | Cell Global Identifier |
| CIR | Channel Impulse Response |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multipie Access |

| Abbreviation | Explanation |
| --- | --- |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSS | Primary Synchronization Signal |
| PUCCH | Physical Uplink Control Channel |
| PUSCH | Physical Uplink Shared Channel |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

The invention claimed is:

1. A method, performed by a wireless device, for prioritizing channel state information reports, the method comprising the wireless device:

determining to transmit one of a plurality of Physical Uplink Control Channel (PUCCH) based channel state information (CSI) reports that are each separately scheduled for transmission responsive to determining that the PUCCH based CSI reports would be transmitted in a same slot with a PUCCH transmission carrying acknowledgement information indicating whether data was successfully or unsuccessfully received by the wireless device, wherein the PUCCH based CSI report to be transmitted is selected according to a plurality of priority rules, wherein a first of the plurality of priority rules is associated with a time domain behavior of the PUCCH based CSI reports such that a semi-persistent CSI report has priority over a periodic CSI report and wherein a further one of the plurality of priority rules is associated with reportConfigIDs of the PUCCH based CSI-reports such that, when the first of the plurality of priority rules assigns the same priority to each of the PUCCH based CSI reports, a CSI report having a lower reportConfigID has priority over a CSI report having a higher reportConfigID; and transmitting, in a PUCCH transmission by the wireless device in that slot, the selected channel state information report and the acknowledgement information.

2. The method of claim 1, wherein the determining to transmit the portion includes determining not to transmit at least one of the plurality of PUCCH based CSI reports.

3. The method of claim 1, wherein a second of the plurality of priority rules is associated with a parameter of a PUCCH based CSI report, wherein the parameter is Report Signal Received Power (RSRP), such that, when the first priority rule assigns the same priority to each of the PUCCH based CSI reports, a CSI report comprising a RSRP parameter is prioritized over a CSI report not comprising a RSRP parameter; and wherein the further one of the plurality of priority rules is associated with the reportConfigIDs of the PUCCH based CSI reports such that, when the first of the plurality of priority rules assigns the same priority to each of the PUCCH based CSI reports and the second of the plurality of priority rules assigns the same priority to each of the PUCCH based CSI reports, a CSI report having a lower reportConfigID has priority over a CSI report having a larger reportConfigID.

4. The method of claim 1, wherein the determining to transmit the portion includes determining that each PUCCH based CSI report would be transmitted on at least one same symbol of the slot, whereon the acknowledgment information would also be transmitted.

5. The method of claim 1, wherein each of the plurality of PUCCH based CSI reports is scheduled for transmission on a respective PUCCH.

6. The method of claim 1, wherein each of the plurality of PUCCH based CSI—reports is a periodic and/or semi-persistent channel state information report.

7. The method of claim 1, wherein the acknowledgement information is a Hybrid Automatic Repeat Request Acknowledgement (HARQ-ACK).

8. The method of claim 7, wherein the determining to transmit the portion includes determining that at least two PUCCH resources, each conveying a respective one or more of the CSI reports, overlap with a dynamically scheduled PUCCH conveying HARQ-ACK.

9. A method performed by a network node, the method comprising the network node:

receiving, a Physical Uplink Control Channel (PUCCH) in a same slot and from a wireless device, at least one prioritized PUCCH based channel state information (CSI) report selected from a plurality of PUCCH based CSI reports and acknowledgement information indicating whether data was successfully or unsuccessfully received by the wireless device, wherein each of the plurality of PUCCH based CSI-reports and the acknowledgement information is separately scheduled for transmission by the wireless device in the same slot, wherein the at least one prioritized PUCCH based CSI report is selected from the plurality of PUCCH based CSI reports based on a plurality of priority rules, wherein a first one of the plurality of priority rules is associated with a time domain behavior of the PUCCH based CSI reports such that a semi-persistent CSI report has priority over a periodic CSI report and wherein another one of the plurality of priority rules is associated with reportConfigIDs of the PUCCH based CSI-reports such that, when the first one of the plurality of priority rules assigns the same priority to the PUCCH based CSI reports, a CSI report having a lower reportConfigID has priority over a CSI report having a larger reportConfigID.

10. The method of claim 9, further comprising separately scheduling the plurality of PUCCH based CSI—reports for transmission by the wireless device.

11. The method of claim 9, wherein the at least one prioritized PUCCH based CSI report is received based on the plurality of priority rules.

12. The method of claim 9, wherein a second one of the plurality of priority rules is associated with a parameter of the PUCCH based CSI-report, wherein the parameter is Report Signal Received Power (RSRP), such that, when the first priority rule assigns the same priority to the PUCCH based CSI reports, a CSI report comprising a RSRP parameter is prioritized over a CSI report not comprising a RSRP parameter; and wherein the another one of the plurality of priority rules is associated with the reportConfigIDs of the PUCCH based CSI reports such that, when the first one of the plurality of priority rules assigns the same priority to the PUCCH based CSI reports and the second one of the plurality of priority rules assigns the same priority to the PUCCH based CSI reports, a CSI report having a lower reportConfigID has priority over a CSI report having a larger reportConfigID.

13. The method of claim 9, wherein the receiving is on at least one symbol of the slot.

14. The method of claim 9, wherein each of the plurality of PUCCH based CSI reports is scheduled for transmission on a respective Physical Uplink Control Channel (PUCCH).

15. The method of claim 9, wherein the acknowledgement information is a Hybrid Automatic Repeat Request Acknowledgement (HARQ-ACK).

16. A wireless device, comprising:
processing circuitry; and
memory containing instructions executable by the processing circuitry whereby the wireless device is configured to:
determine to transmit a one of a plurality of Physical Uplink Control Channel (PUCCH) based channel state information (CSI) reports that are each separately scheduled for transmission responsive to determining that the plurality of PUCCH based CSI reports would be transmitted in a same slot with PUCCH transmission carrying acknowledgement information indicating whether data was successfully or unsuccessfully received by the wireless device, wherein the wireless device is configured to select the PUCCH based CSI report to be transmitted according to a plurality of priority rules, wherein a first one of the plurality of priority rules is associated with a time domain behavior of the PUCCH based CSI reports such that a semi-persistent CSI report has priority over a periodic CSI report and wherein another one of the plurality of priority rules is associated with the reportConfigIDs of the PUCCH based CSI-reports such that, when the first one of the plurality of priority rules assigns the same priority to the PUCCH based CSI reports, a CSI report having a lower reportConfigID has priority over a CSI report having a larger reportConfigID; and
transmit, in a PUCCH transmission in that slot, that portion of the CSI reports and the acknowledgement information.

17. A base station, comprising:
processing circuitry;
memory containing instructions executable by the processing circuitry whereby the base station is configured to:
receive, in a physical uplink control channel (PUCCH) transmission in a same slot and from a wireless device, at least one prioritized PUCCH channel state information (CSI) report selected from a plurality of PUCCH based CSI reports and acknowledgement information indicating whether data was successfully or unsuccessfully received by the wireless device, wherein each of the plurality of PUCCH based CSI reports and the acknowledgement information is separately scheduled for transmission by the wireless device in the same slot, wherein the at least one prioritized PUCCH based CSI report is selected from the plurality of PUCCH based CSI reports based on a plurality of priority rules, wherein a first one of the plurality of priority rules is associated with a time domain behavior of the PUCCH based CSI reports such that a semi-persistent CSI report has priority over a periodic CSI report and wherein another one of the plurality of priority rules is associated with the reportConfigIDs of the PUCCH based CSI-reports such that, when the first one of the plurality of priority rules assigns the same priority to the PUCCH based CSI reports, a CSI report having a lower reportConfigID has priority over a CSI report having a larger reportConfigID.

* * * * *